United States Patent Office 2,791,616
Patented May 7, 1957

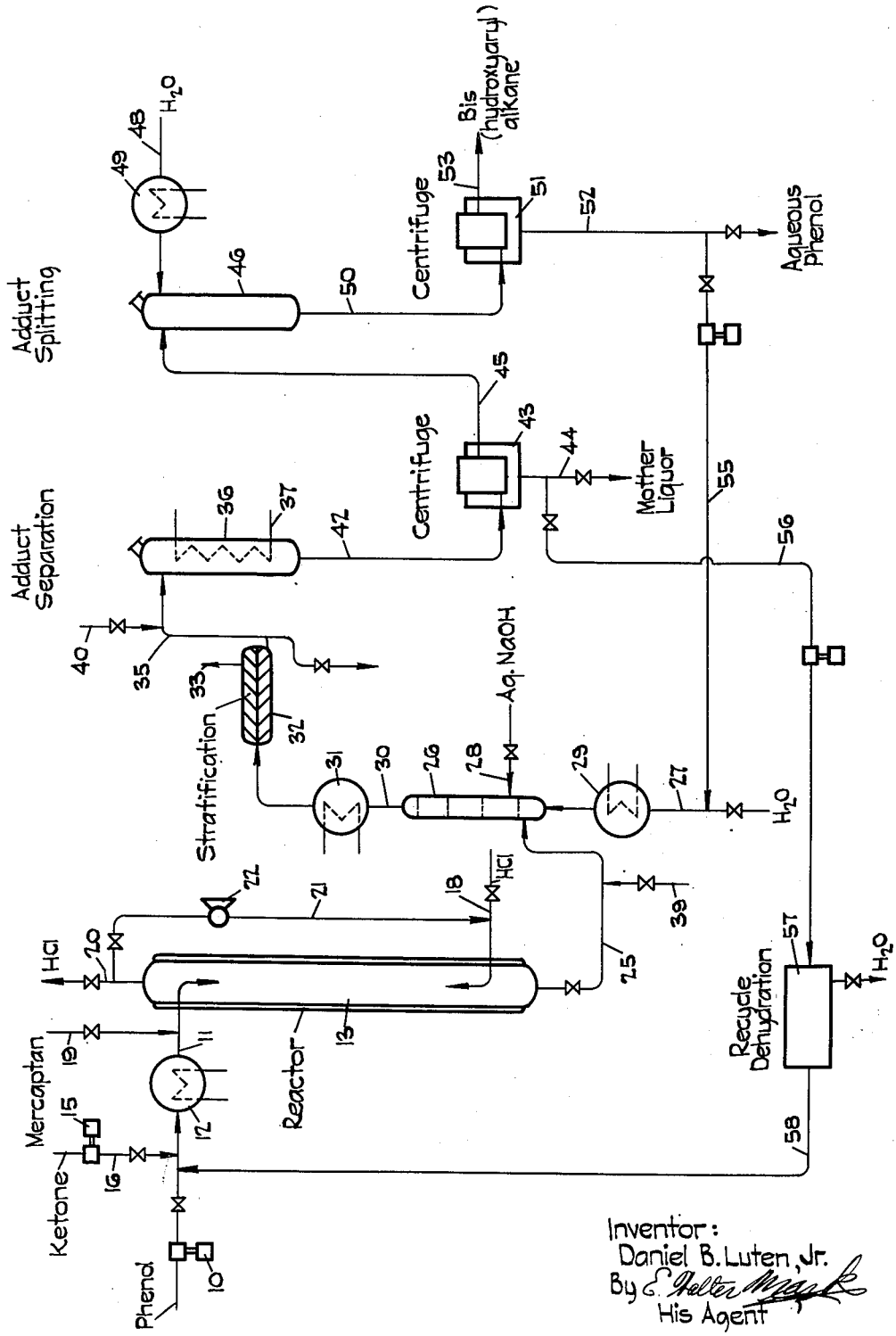

2,791,616

PRODUCTION OF BIS HYDROXYARYL SUBSTITUTED COMPOUNDS

Daniel B. Luten, Jr., Berkeley, Calif., assignor to Shell Development Company, Emeryville, Calif., a corporation of Delaware Application September 29, 1953, Serial No. 382,900

8 Claims. (Cl. 260—619)

This invention relates to the production of bis(hydroxyaryl) compounds and relates more particularly to the production of hydroxyphenyl-substituted alkanes wherein the nuclei of two phenolic radicals are directly attached to a single carbon atom in the alkyl group. A particular aspect of the invention relates to the production of gem-bis(hydroxyphenyl) propane.

Hydroxyphenyl-substituted compounds, comprising the hydroxyphenyl-substituted alkanes, such as, for example, 2,2-bis(hydroxyphenyl) propane have become of increasing importance in many fields of applications. They are of value as starting and intermediate materials in the production of a wide variety of organic products. A particularly important field of application is as starting materials in the manufacture of resinous materials. They are obtained by the condensation of a phenolic compound with a carbonyl compound, for example, a ketone, in the presence of an acid-acting condensation catalyst.

Suitability of the hydroxyphenyl-substituted alkanes, and particularly 2,2-di(hydroxyphenyl) propane, for use in many fields of application is dependent upon the absence therein of any substantial amount of impurities. However, the mixtures obtained by condensation reactions are generally very complex. They often contain impurities which are relatively non-volatile under distillation conditions. Certain other impurities are generally encountered therein which are exceedingly deleterious when present in even very small amounts. The fact that the crude condensation reaction mixtures are generally sufficiently acidic to require neutralization increases still further the complexity of the compositions to be subjected to the product separation. Methods involving a distillation step in which the desired bis(hydroxyphenyl) alkanes are recovered as a bottoms product are, therefore, often incapable of producing a product of high purity which is also substantially free of discoloration because of retention of relatively involatile impurities and the adverse effect upon product quality of the temperature conditions unavoidably encountered during the distillation, even when this operation is conducted at reduced pressure.

Addition of substantial amounts of water to the condensation reaction mixtures, followed by crystallization of a solid phase comprising di(hydroxyaryl) compounds directly from the resulting aqueous mixture results in the obtaining of a product containing admixed therewith substantial amounts of impurities the separation of which by methods disclosed heretofore is generally exceedingly difficult if at all possible.

It has now been found that when a bis(hydroxyphenyl) alkane such as 2,2-di(4-hydroxyphenyl) propane, is crystallized from a phenol-rich reaction mixture containing it in the absence of substantial amounts of water it is obtained in the form of an adduct containing 2,2-di(4-hydroxyphenyl) propane and the phenol from which it is derived in substantially equimolar proportions. However, the solid phase thus formed generally contains certain amounts of impurities. Attempts to effect the removal of phenol from such solid phase by steps involving a distillation, or the like, wherein the desired bis(hydroxyphenyl) alkane is obtained as a bottoms product, often results in a highly unsatisfactory product because of the unavoidable retention therein of the high boiling impurities, occluded lower boiling impurities, and because of the adverse effect upon product quality of the temperatures unavoidably encountered during the distillation even when this operation is effected under reduced pressure. It has now also been found that the addition complex, comprising the bis(hydroxyphenyl) propane and phenol in substantially equimolar proportions, separated from the phenol-rich reaction mixture by crystallization will, within a well-defined temperature range and in the presence of a substantial excess of added water, liberate phenol with the result that all of the phenol is dissolved in the water and substantially all of the desired bis(hydroxyphenyl) propane remains in the solid state. The aqueous phase containing only a relatively small amount of phenol is in equilibrium with solid bis(hydroxyphenyl) propane rather than the bis(hydroxyphenyl) propane-phenol adduct. The solid bis(hydroxyphenyl) propane can thereafter be separated in an exceedingly high degree of purity from such dilute aqueous phenol solution by simple readily available conventional mechanical separating means involving, for example, one or more such steps as decantation, filtration, centrifuging and the like.

In accordance with the present invention bis(hydroxyaryl) - substituted compounds comprising bis(hydroxyphenyl) alkanes, such as, for example, 2,2-di(hydroxyphenyl) propane, are obtained in a high degree of purity from the crude reaction mixtures, obtained by the acid-catalyzed condensation of a phenolic compound with a carbonyl compound, by the successive steps comprising: cooling the crude reaction mixture, in the presence of a substantial amount of unreacted phenolic compound, to a temperature sufficiently low to effect the formation by crystallization of a solid phase consisting essentially of a complex compound containing the bis(hydroxyphenyl) alkane and unreacted phenolic compound in substantially equimolar amounts; separating said solid phase by mechanical separating means, such as, for example, filtration, centrifuging, or the like, from the liquid phenolic phase of the reaction mixture; adding water in substantial amount to the solid phase thus separated from the reaction mixture, thereby liberating the "unreacted" phenolic compound from the solid phase with the formation of an admixture of a solid phase consisting essentially of bis(hydroxyphenyl) alkane in an aqueous phase consisting essentially of a dilute aqueous solution of the liberated "unreacted" phenolic compound; and separating the solid phase from said aqueous mixture by mechanical means, such as, for example, filtration, centrifuging and the like.

In a modification of the invention water is first added to the phenolic bis(hydroxyphenyl) alkane-containing condensation reaction mixture. The resulting aqueous admixture is thereupon subjected to stratification under conditions forming a layer consisting essentially of a liquid phenolic phase comprising the unreacted phenolic compound and bis(hydroxyphenyl) propane and a separate layer consisting essentially of a liquid aqueous phase comprising water, a lesser amount of the unreacted phenolic compound and impurities. The phenolic phase is separated from the aqueous phase. Bis(hydroxyphenyl) alkane is thereupon separated from the resulting phenolic phase as the bis(hydroxyphenyl) alkane compound complex by crystallization. The resulting complex is broken with water and bis(hydroxyphenyl) alkane separated from the resulting aqueous phase.

A particularly advantageous feature of the invention resides in the ability to neutralize the crude acidic bis(hydroxyphenyl) alkane-containing reaction mixture prior to the separation treatment without complicating to any substantial degree the recovery operation, or affecting adversely the purity of the product. In a preferred method of carrying out the invention alkaline material is added to the reaction mixture in amount sufficient to neutralize acidic components, such as, for example, residual acidic catalyst, prior to subjecting the mixture to stratification in the presence of added water.

It is an object of the present invention to provide an improved process enabling the more efficient production of desired bis(hydroxyaryl) substituted compounds by the condensation of a phenol with a carbonyl compound wherein the desired bis(hydroxaryl) substituted compounds are obtained in a high degree of purity with a minimum of operative steps.

Another object of the invention is the provision of an improved process enabling the more efficient production in a continuous operation of bis(hydroxyphenyl) alkanes in a high state of purity.

Still another object of the invention is the provision of an improved process enabling the more efficient recovery of bis(hydroxyphenyl) alkanes in a high state of purity from crude condensation products containing them, wherein subjection of the bis(hydroxyphenyl) alkanes to distillation conditions is substantially avoided.

A particular object of the invention is an improved process enabling the more efficient production, in a continuous operational procedure, of high purity 2,2-di(4-hydroxyphenyl) propane by the acid-catalyzed condensation of phenol with acetone. Other objects and advantages of the invention will become apparent from the following detailed description thereof made with reference to the attached drawing wherein the single figure represents more or less diagrammetrically one form of apparatus suitable for carrying out the process of the invention.

The invention is applied broadly to the treatment of bis(hydroxyaryl) compound-containing reaction mixtures obtained by acid-catalyzed condensation of a carbonyl compound with a phenol.

Phenolic compounds reacted with carbonyl compounds to obtain bis(hydroxyaryl) compound-containing reaction mixtures treated in accordance with the present invention comprise phenolic compounds having at least one replaceable hydrogen atom directly attached to a nuclear carbon atom of the phenolic radical. By the term "phenolic compounds" as used herein and in the appended claims is meant those organic compounds containing an aromatic radical and one hydroxyl group, said hydroxyl group being linked directly to a carbon atom contained in the nucleus of the aromatic radical. The phenolic compounds, as a class, employed as starting material in the production of bis(hydroxyaryl) compounds, comprise the simplest member of the class, phenol, and the homologues and substitution products of phenol containing at least one replaceable hydrogen atom directly attached to a nucelar carbon atom in the phenolic radical. Suitable phenolic compounds comprise those wherein hydrogen atoms of the aromatic phenolic nucleus have been substituted by hydrocarbon radicals, such as alkyl, cycloalkyl, aryl, alkaryl and aralkyl groups. Suitable phenolic compounds include among others the following: phenol, the cresols, the xylenols, thymol, carvacrol, cumenol, 2-methyl-6-ethylphenol, 2,4-dimethyl-3-ethylphenol, 4-ethylphenol, 2-ethyl-4-methylphenol, 2,3,6-trimethylphenol, 2-methyl-4-tertiarybutylphenol, 2,4-ditertiarybutylphenol, 4-methyl-2-tertiarybutylphenol, 2-tertiarybutyl - 4 - methylphenol. 2,3,5,6-tetramethylphenol, 2,6-dimethylphenol, 2,6-ditertiary-butylphenol, 3,5-dimethylphenol, 3-5-diethylphenol, 2 - methyl-3,5-diethylphenol, o-phenylphenol, p-phenylphenol, the naphthols, phenanthrol, their homologues and analogues. Suitable phenolic compounds comprise those containing more than one phenolic group in each nucleus as well as polynuclear compounds having one or more than one phenolic group in each nucleus. Mixtures of the above compounds may be used as the starting phenolic reactant. Mixtures of phenolic compounds such as found in commercial products, such as cresylic acid, e. g. petroleum cresylic acids, and the like, may serve as the phenolic starting material of the process within the scope of the invention.

Phenolic compounds leading to products of particular value in many fields of application comprise those having a total number of carbon atoms in the range of, for example, from 6 to about 20, and wherein individual substituent hydrocarbon groups contain from one to about 12 carbon atoms.

Carbonyl compounds reacted with a phenolic compound to obtain bis(hydroxyaryl) compounds are represented by the empirical formula:

$$R^1-\underset{\underset{O}{\|}}{C}-R^2 \qquad (I)$$

wherein $R^1$ represents a member of the group consisting of any monovalent organic radical, aliphatic, cycloaliphatic, aromatic, heterocyclic, including hydrocarbon radicals such as alkyl, cycloalkyl, aryl, aralkyl, alkaryl, including saturated and unsaturated groups; and $R^2$ represents a member of the group consisting of hydrogen and any monovalent organic radical, aliphatic, cycloaliphatic, aromatic, heterocyclic, including hydrocarbon radicals such as alkyl, cycloalkyl, aryl, aralkyl, alkaryl. The suitable carbonyl compounds comprise the ketones and aldehydes. Examples of such suitable ketones and aldehydes comprise dimethyl ketone, methyl ethyl ketone, diethyl ketone, dibutyl ketone, methyl isobutyl ketone, cyclohexanone, propionylphenone, methyl- and amyl-ketone, mesityl oxide, cyclopentanone, acetophenone and acetaldehyde, propionaldehyde, butyraldehyde and benzaldehyde.

The specific carbonyl compound employed as starting material will depend upon the specific bis(hydroxyaryl) compound desired and may be governed to some extent by specific operating conditions employed. Particularly suitable compounds comprised in the above-defined class of carbonylic compounds comprise the aliphatic ketones and aldehydes having from three to fourteen carbon atoms to the molecule.

Reaction of the phenolic compound with the carbonyl compound to obtain bis(hydroxyaryl) compound-containing reaction mixtures is carried out at a temperature in the range of from about 20° C. to about 110° C., and preferably from about 45° C. to about 80° C. Atmospheric, subatmospheric or superatmospheric pressures may be employed. The reaction is effected in the presence of acid-acting catalyst, such as, for example, a hydrogen halide, such as hydrogen chloride preferably in the anhydrous state. Although hydrogen chloride is a preferred catalytic agent, the invention is in no wise limited to the use of only this agent. Acidic agents, comprising any strong mineral acid and acid-acting condensing agents, such as, for example, sulfuric acid, hydrochloric acid, phosphoric acid, hydrobromic acid, boron fluoride, para-toluene sulfonic acid, and other acid-acting compounds, comprising compounds which are hydrolyzed by water to form acids, such as aluminum chloride, etc., may be employed.

The condensation reaction is generally executed in the presence of an added auxiliary catalyst comprising, for example, sulfur-containing compounds, such as, for example, hydrogen sulfide, the mercaptans, the mercaptals, the mercaptols, thio acids, dithio acids, etc. Preferred auxiliary catalysts comprise the alkane mercaptans. Of these, methyl mercaptan is employed with particular advantage as disclosed and claimed in copending application Serial No. 306,172, filed August 25, 1952 now U. S. Patent 2,730,552 issued January 10, 1956.

The condensation reaction is preferably executed with an excess of the phenolic compound, for example, a ratio of phenolic compound to carbonyl compound of at least 3. Particularly preferred is the use of a molal ratio of phenolic component to carbonyl component of at least 10:1, for example, from about 10:1 to about 25:1 as disclosed and claimed in copending application Serial No. 306,171, filed August 25, 1952 and now abandoned.

Although the process of the invention is not limited to a specific method of carrying out the condensation reaction resulting in the crude bis(hydroxyphenyl)-containing reaction mixture treated in accordance with the present invention, it lends itself with particular advantage to the treatment of the products obtained by a continuous operation, such as, that disclosed and claimed in copending application Serial No. 306,173, filed August 25, 1952 now U. S. Patent 2,730,553 issued January 10, 1956.

Advantages in the production of the bis(hydroxyphenyl) alkanes by the acid catalyzed condensation of a phenol with a carbonyl compound are often obtained by the use of a reaction zone comprising at least one zone of enlarged cross-sectional area such as, for example, a tower-type or column-type reactor. Reactants are passed in liquid phase downwardly through the reaction zone countercurrent to an upward flow of condensation catalyst. A high liquid level is preferably maintained in the reactor. Maintenance of desired reaction temperatures may be brought about by thermal insulation of the reactor and controlled adjustment of the temperature of the charge to the reactor. Additional means enabling the addition or withdrawal of heat from the reaction zone may, however, be resorted to in such operation within the scope of the invention.

Under the above-defined conditions the phenolic component and the carbonylic component of the charge to the process interact with the formation of a reaction mixture comprising bis(hydroxyphenyl) compounds. The bis(hydroxyphenyl) compounds obtained consist essentially of compounds wherein the nuclei of two phenolic radicals are directly attached by carbon-to-carbon linkage to the same single carbon atom in the alkyl group as represented by the following formula:

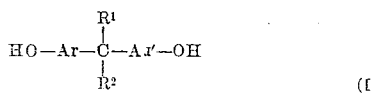

(I wherein $R^1$ is a member of the group consisting of monovalent organic radicals including hydrocarbon radicals such as alkyl, cycloalkyl, aryl, alkaryl and aralkyl which may be saturated or unsaturated, and $R^2$ is a member of the group consisting of hydrogen and monovalent organic radicals including hydrocarbon radicals such as alkyl, cycloalkyl, aryl, alkaryl and aralkyl which may be saturated or unsaturated; and Ar—OH and Ar'—OH are phenolic radicals. In the bis(hydroxyaryl) alkanes represented by Formula II the radicals $R^1$ and $R^2$ have the same significance as in the above defined Formula I representing the suitable carbonylic starting materials. The phenolic radicals Ar—OH and Ar'—OH in the above Formula II will correspond to the phenolic radical obtained by the removal of hydrogen from a nuclear carbon atom of a phenolic component of the charge to the process. Hydroxyphenyl-substituted compounds, having a specifically desired composition and structure, are therefore obtained by the judicious selection of specific carboxylic and phenolic starting reactants. Thus, the interaction of unsubstituted phenol with an aliphatic ketone such as, for example, dimethyl ketone, will result in reaction products comprising gem(4-hydroxyphenyl) propane. The reaction products obtained will generally comprise isomeric forms of the bis(hydroxyaryl) compounds. Thus, when interacting unsubstituted phenol with dimethyl ketone in accordance with the invention, the reaction products will comprise a mixture of 2,2-di(4-hydroxyphenyl) propane, 2,2-di(2-hydroxyphenyl) propane, 2-(4-hydroxyphenyl)-2-(2-hydroxyphenyl) propane, etc., in which the 2,2-di(4-hydroxyphenyl) propane will generally predominate.

An initial step of product recovery comprises the crystallization of the bis(hydroxyaryl) compound in the presence of substantial amount of the unreacted phenol. The presence of a sufficient amount of unreacted phenolic reactant in the reaction products is generally assured by the execution of the reaction in the presence of a large excess of the phenolic reactant over the carbonyl reactant. However, to assure the presence of a sufficient amount of phenol to enable crystallization from a phenolic phase additional amounts of unreacted phenolic constituent may be added to the reaction mixture prior to initiating product separation. The phenol thus additionally added need not necessarily be the same as that used in the condensation reaction. Crystallization is carried out by bringing the reaction mixture to a temperature at which at least a substantial part of the bis(hydroxyaryl) compound content thereof will crystallize out as a solid phase. In the presence of excess phenol, bis(hydroxyphenyl) propane crystallizes out as a complex compound comprising an adduct of the desired bis(hydroxyphenyl) propane in combination with unreacted phenol. The specific crystallization temperature employed will vary in accordance with the composition of the mixture and particularly with respect to the amount of phenolic constituent therein. Care is taken, however, to avoid cooling the mixture to a temperature so low that substantial amounts of constituents other than the desired bis(hydroxyphenyl) alkane-containing adduct are separated out. The solid phase obtained as a result of the crystallization is separated by mechanical separating means comprising one or more such steps as, for example, decantation, filtration, centrifuging, and the like.

Often it is found desirable to add water in substantial amount to the complex condensation reaction mixture prior to effecting the initial crystallization from phenolic phase. Water may be added for the purpose of quenching the reaction, for dissolving water-soluble impurities in an aqueous phase, for aiding in the introduction of neutralizing agents, etc. Since it is essential that the bis(hydroxyphenyl) alkane-containing addition compound be separated from a phenolic phase to obtain the objects of the invention, the aqueous reaction mixture is subjected to stratification prior to crystallizing the desired bis(hydroxyphenyl) alkane as an addition compound therefrom. The stratification carried out at a temperature sufficiently high to avoid the formation of any substantial amount of solid phase comprising bis(hydroxyphenyl) alkane, but below the temperature at which separation of an aqueous phase from a phenolic phase becomes difficult. As a result of the stratification there is formed a liquid phenolic phase comprising bis(hydroxyphenyl) alkane in admixture with unreacted phenolic compound, and a separate liquid aqueous phase consisting predominately of water containing a lesser amount of unreacted phenolic reactant, water-soluble impurities, etc.

A particular advantage of the invention resides in the ability to neutralize the reaction prior to product separation without incurring the aggravation of difficulties heretofore generally encountered in product separation. Neutralization, in accordance with the process of the invention, furthermore, is found to have no detrimental effect upon product quality. Neutralization of the reaction mixture is accomplished by adding to the reaction mixture an alkaline material capable of reacting with residual acidic components, such as, for example, residual acid-acting catalyst, in the reaction mixture. Suitable alkaline materials comprise ammonium hydroxide alkali metal hydroxides, such as, sodium hydroxide, potassium hydroxide and the like; sodium carbonate, sodium bicarbonate; alkaline earth metal compounds, etc. The alkaline neutralizing agent is preferably added in the form of an aqueous solution. When neutralizing the condensation reaction mixture in the initial phase of product separation it is essential that a substantial amount of water be added to the mixture, either prior to, during, or immediately after the addition of alkaline material. Products, such as, for example, salts, resulting from the neutralization reaction, are generally water soluble and therefore at least a substantial part thereof will be removed in the aqueous phase formed during the stratification of the aqueous reaction mixture. Also comprised in the aqueous phase obtained in the stratification will be at least a substantial part of the high melting impurities having a low solubility in phenol present in the crude reaction mixture.

The liquid phenolic phase formed during the stratification step is separated from the liquid aqueous phase and cooled at a temperature sufficiently low to effect the crystallization of a solid phase comprising bis(hydroxyphenyl) alkane as a phenolic addition compound. The resulting addition compound-containing solid phase is separated by filtration.

The solid phase separated from the condensation reaction mixture in the presence of an excess of the phenolic reactant, and consisting substantially of an adduct comprising the desired bis(hydroxyphenyl) alkane and unreacted phenolic reactant may be washed with a suitable solvent. Suitable solvents comprise, for example, a phenol such as, for example, the phenolic charge to the condensation reaction, such as phenol; also diisopropyl ether, chlorobenzene, a chloro-alkane, aliphatic alcohols, anisole, etc. The washing step will aid in the removal of any residual impurities from the separated crystallized bis(hydroxyphenyl) alkane-containing adduct. It is found that generally such a washing step is not essential to the attainment of the objects of the present invention. The bis(hydroxyphenyl) alkane-containing adduct thus separated from a phenolic phase is thereupon admixed with water in sufficient amount to effect the liberation of unreacted phenolic compound from the bis(hydroxyphenyl) alkane-containing adduct. Water is added in an amount resulting in the presence of the liberated unreacted phenolic constituent therein as a dilute solution in the water. The amount of water preferably employed will vary in accordance with operating conditions, particularly temperature, the specific compounds present, etc. Addition of water in an amount exceeding about five times, and preferably about twenty-five times the weight of unreacted phenolic compound liberated from the adduct has been found satisfactory. Liberation of the unreacted phenolic constituent from the bis(hydroxyaryl) compound-containing adduct by water addition is preferably effected at slightly elevated temperatures. The specific temperature employed will vary in accordance with the operating conditions and the nature of particular materials treated. Temperatures in the range of from about 0° C. to about 80° C., and preferably from about 40° C. to about 75° C. have been found satisfactory. Under these conditions it is found that substantially all of the liberated unreacted phenolic constituent dissolves in the water, and that substantially no bis(hydroxyphenyl) alkane is dissolved. The bis(hydroxyphenyl) alkane remaining as a solid phase is separated from the liquid aqueous phase by mechanical separating means comprising one or more such steps as, for example, decantation, filtration, centrifuging and the like. The separated product is dried. The bis(hydroxyaryl) compound separated from the dilute aqueous phenol is found to be of unusually high purity, devoid of any substantial degree of coloration, in the form of fine, free flowing crystals.

In order to set forth more fully the nature of the invention it is described hereinafter in its application to the production of a high purity, bis(hydroxyphenyl) alkane, such as, for example, gem di(hydroxyphenyl) propane, with reference to the attached drawing.

A phenol, for example, phenol, emanating from an outside source is forced by means of pump 10, through valved line 11, provided with heat exchanger 12, into a reaction zone. The reaction zone may comprise a zone of an enlarged cross-sectional area, such as, for example, a tower-type reactor 13. A carbonyl compound, such as, for example, dimethyl ketone, emanating from an outside source, is forced by means of pump 15, through valved line 16, into line 11 discharging into reactor 13. Reactants entering the system through valved line 11 are introduced into the upper part of reactor 13. Pressures within reactor 13 are kept sufficiently high to maintain at least a substantial part of the reactants therein in the liquid phase. A high liquid level is maintained within reactor 13 throughout the course of the operation. An acid-acting catalyst which is not completely miscible with the reactants at the reaction conditions is introduced into the lower part of the reactor through valved line 18. Preferred catalysts comprise those which are in the gaseous or vapor state at the reaction conditions, for example, a hydrogen halide such as hydrogen chloride. An auxiliary sulfur-containing catalyst for the reaction, such as, alkyl mercaptans consisting of, or predominating in methyl mercaptan, is introduced from an outside source, through valved line 19, into line 11. Material, comprising catalyst and auxiliary catalyst, flowing upwardly through the reactor, is removed from the upper part of reactor 13 by means of valved line 20. Material removed from reactor 13 through valved line 20 is recycled in part or entirety through valved line 21, by means of pump 22, into line 18 discharging into the lower part of reactor 13. Temperatures within reactor 13 are maintained in the range of, for example, from about 30° C. to about 100° C., and preferably from about 40° C. to about 70° C. Temperature conditions within reactor 13 may be maintained by means of heat input, or heat withdrawal from the charge, for example, with the aid of heat exchanger 12. Other means not shown in the drawing may be provided for the maintenance of the desired temperature conditions within reactor 13.

Reactants are preferably charged to reactor 13 under conditions maintaining a high ratio of phenol to dimethyl ketone. Thus, it is preferred to introduce the reactants in controlled amounts to obtain a feed to the reactor containing at least eight moles of phenol for each mole of dimethyl ketone. It is preferred to maintain the mole ratio of phenol to dimethyl ketone in the charge in the range of from about 15:1 to about 25:1. Higher or lower ratios of phenol to dimethyl ketone may, however, be employed within the scope of the invention. Particularly preferred conditions comprise the use of a high ratio of phenol to dimethyl ketone and the control of the temperature of the charge to the reactor to maintain a temperature in the range of from about 30° C. to about 40° C. in the upper part of the reaction zone, and a maximum temperature of from about 70° C. to about 80° C. in the lower part of the reaction zone. The time of contact employed may vary in accordance with operating conditions employed. A contact time of less than about 30 minutes will be found satisfactory. Thus, a contact time in the range of from about 10 to 15 minutes has been found adequate. Longer or shorter contact times may, however, be employed within the scope of the invention. Operating conditions maintained within reactor 13 are preferably controlled to assure the obtaining of a reactor effluence consisting essentially of a single liquid phase. Means aiding in the maintenance of desired reactor conditions, such as, for example, the provision of lagging, cooling jacket, thermal insulation, etc., may be provided.

Under these conditions phenol will react with dimethyl ketone in reactor 13 with the formation of reaction products comprising 2,2-bis(para-hydroxyphenol) propane.

Effluence from reactor 13 is passed therefrom through valved line 25 into a mixing zone. The mixing zone may comprise, for example, a column 26. Column 26 may be provided with suitable packing, baffles, grid trays, or the like to assure turbulent flow therethrough. Water is introduced into the lower part of column 26 by means of valved line 27. An alkaline material, such as, for example, aqueous sodium hydroxide, is introduced into the lower part of column 26 by means of valved line 28. Aqueous sodium hydroxide is introduced into column 26 in an amount not substantially exceeding that required to neutralize residual acidic constituents, such as, residual HCl catalyst, in the reactor effluent stream. The amount of water introduced into column 26 by means of line 27 may vary considerably within the scope of the invention. In general the addition of water in an amount ranging from about 0.1 to about 10, and preferably from about 2 to about 5 times the volume of reactor effluence is satisfactory. Greater or lesser amounts of water may be added, however, within the scope of the invention.

From mixing column 26 the neutralized aqueous reactor effluence is passed through line 30 containing heat exchanger 31 into a stratifying zone comprising, for example, a tank 32. Within tank 32 the aqueous neutralized reactor effluence is permitted to stratify at a temperature at which a separate phenolic phase will form. The stratification temperature is maintained sufficiently high to avoid the separation of any substantial amount of bis(hydroxyphenyl) propane-containing solid phase but low enough to enable separation of a separate liquid aqueous phase from a phenolic phase. Temperatures in the range of, for example, from about 35° C. to about 100° C., and preferably from about 50° C. to about 70° C., will generally be found satisfactory. Under these conditions there will be formed a liquid aqueous phase comprising phenol, sodium chloride and minor amounts of impurities, and a separate liquid phenolic phase comprising unreacted phenol, bis(hydroxyphenyl) propane and water-insoluble impurities comprising by-product bisphenols. The aqueous phase is withdrawn from chamber 32 by means of valved line 33. Maintenance of the desired stratification temperature is assured by heat input with the aid of exchangers 29 and 31.

The liquid phenolic phase, consisting essentially of unreacted phenol, bis(hydroxyphenyl) propane and water-insoluble impurities comprising by-product bis-phenols is passed from chamber 32, through line 35, into a crystallizing zone comprising, for example, a chamber 36. Chamber 36 is provided with suitable means for maintaining the desired temperatures therein, such as, for example, a closed cooling coil 37. Other means not shown in the drawing may be provided for the maintenance of desired temperatures therein.

Bis(hydroxyphenyl) propane-containing mixtures obtained by the condensation of phenol with dimethyl ketone, emanating from an outside source, may be introduced into the system to be subjected therein to product separation in accordance with the invention. Valved lines 39 and 40 are provided for the introduction of such additional charge into the system. Materials thus introduced through valved line 39 and/or 40 may comprise a part, or all, of the bis(hydroxyphenyl) propane-containing material treated in the system.

Within chamber 36 the liquid hydroxyphenyl propane-containing phenolic phase is cooled to a temperature sufficiently low to effect the formation of a solid phase comprising at least a substantial part of the hydroxyphenyl propane content of the charge to chamber 36. Temperatures in the range of, for example, from about 0° C. to about 50° C., and preferably from about 20 to about 25° C. have been found suitable. The solid phase formed in chamber 36 will comprise bis(hydroxyphenyl) propane as a phenol-bis(hydroxyphenyl) propane adduct containing substantially equimolar parts of phenol and bis(hydroxyphenyl) propane.

The cooled contents of chamber 36 are passed through line 42 into a suitable separating zone. The separating zone may comprise means capable of effecting, by mechanical means, the separation of the adduct-containing solid phase from the liquid phase, such as, for example, a filter, a centrifuge or the like. Within the drawing the separating means is shown as a centrifuge 43. The solid phase, comprising the phenol-bis(hydroxyphenyl) propane adduct, is separated from the liquid phase comprising phenol and phenolic by-products of the condensation reaction in centrifuge 43. The phenolic mother liquor, comprising phenol containing phenolic by-products is taken from centrifuge 43 through line 44.

The adduct-containing solid phase separated in 43 is passed into an adduct splitting zone comprising, for example, a chamber 46. Conventional means are employed for the passage of the solid phase from centrifuge 43 into 46. Such means may comprise, for example, a conveyer of screw or belt type, or other suitable means, represented in the drawing by line 45. Water is introduced into chamber 46 from an outside source by means of line 48 containing heater 49. Water is introduced into chamber 46 in an amount exceeding substantially the volume of bis(hydroxyphenyl) propane-phenol adduct. Water may be introduced into chamber 46 in an amount assuring the ratio of water to adduct of, for example, at least four times the weight of the addition compound. Use of water in the amount of from about four to about thirty five and preferably from about seven to about fifteen times the weight of the adduct is satisfactory. Greater or somewhat lesser amounts of water may, however, be employed within the scope of the invention. The specific amount of water preferably employed may vary to some extent with specific operating conditions, particularly the temperature, employed.

Within chamber 46, in the presence of the substantial excess of water, the phenol-(bis-hydroxyphenyl) propane adduct is split with the formation of bis(hydroxyphenyl) propane and phenol. Temperature conditions in chamber 46 are controlled to assure the maintenance of but a single liquid phase therein with the maintenance of the bis (hydroxyphenyl) propane as a solid phase. The contents of the chamber 46 may be maintained at a temperature in the range of, for example, from about 0° C. to about 80° C., and preferably from about 40° C. to about 65° C. Under the conditions maintained in chamber 46, substantially all of the phenol liberated from the adduct will be dissolved in the water while substantially all of the hydroxyphenyl propane will remain undissolved.

Contents of chamber 46 are passed through line 50 into a suitable separating zone comprising suitable means, such as, for example, a filter centrifuge, or the like, enabling the separation of the solid phase from the liquid phase by essentially mechanical means in the absence of any application of heat. The separating means is shown in the drawing as a centrifuge 51. The liquid phase consisting essentially of aqueous phenol is removed from centrifuge 51 by means of valved line 52. A solid phase consisting essentially of bis(hydroxyphenyl) propane in a high state of purity is taken from centrifuge 51 by suitable means comprising, for example, a screw conveyer, or the like, represented in the drawing by line 53. The bis (hydroxyphenyl) propane may be subjected to washing with a suitable solvent, such as, for example, water. The hydroxyphenyl propane separated within centrifuge 51 is dried by suitable conventional means. Suitable drying procedure comprises, for example, drying in air, at a temperature in the range of from about 40° C. to about 75° C.

Aqueous phenol streams produced in the systems and eliminated, for example, through valved lines 33 and 52, may be passed in part, or in their entirety, to suitable means to effect the recovery of phenol therefrom. The phenol thus recovered may be recycled to the condensation reaction. A valved line 55 is provided to enable the passage of at least a part of the dilute aqueous phenol stream from line 52 into line 27.

A particular advantage of the process of the invention resides in the ability to convert at least a substantial part of phenolic by-products formed during the condensation reaction to the desired bis(hydroxyphenyl) propane without detracting to any substantial degree from efficient operation of the process. Thus, the phenolic mother liquor passed from centrifuge 43 through line 44, which comprises not only unreacted phenol but the greater part of the by-products of phenolic character formed within the system, is recycled through lines 56, zone 57 and line 58 into charge line 11 leading into the reactor 13. Within zone 57 the recycle stream is subjected to suitable dehydrating means to effect the removal of any water therefrom. Such dehydrating means may comprise, for example, extraction with solvents in which water has preferential solubility, contact with suitable adsorbents, or other water separating means. The phenolic by-products thus returned to the reaction zone with the unreacted phenol are isomerized or otherwise converted to additional amounts of desired bis(hydroxyphenyl) propane under the conditions maintained in reactor 13. Under the defined condensation conditions 2,2-di(2-hydroxyphenyl) propane and 2-(2-hydroxyphenyl)-2-(4-hydroxyphenyl) propane are isomerized to 2,2-di(4-hydroxyphenyl) propane. The process thus enables the substantially complete conversion of all phenol charged to the desired bis(hydroxyphenyl) propane.

The following examples are illustrative of the invention:

*Example I*

In a continuous operation phenol is reacted at about 75° C. with dimethyl ketone in an autoclave in a mole ratio of phenol to dimethyl ketone of 10:1 in the presence of hydrogen chloride and a small amount of methylmercaptan. The resulting reaction mixture comprising 2,2-di(4-hydroxyphenyl) propane and unreacted phenol is quenched with water to result in an aqueous mixture containing about 70% water. The resulting aqueous mixture is neutralized by the addition of aqueous NaOH thereto and permitted to stratify at about 50° C., thereby forming a liquid phenolic phase containing phenol and about 95% of the bis(hydroxyphenyl) propane originally present in the reaction mixture, and a liquid aqueous phase containing water, phenol and sodium chloride. The phenolic phase is cooled to about 25° C., thereby crystallizing out bis(hydroxyphenyl) propane in the form of a 2,2-di(4-hydroxyphenyl) propane-phenol adduct containing equimolar amounts of 2,2-di(4-hydroxyphenyl) propane and phenol. The adduct is separated by centrifuging at 25° C. Water is added to the separated adduct in an amount equal to about twenty five times the weight of the phenol content of the adduct. The resulting aqueous mixture is brought to a temperature of about 45° C. resulting in the liberation of phenol from the 2,2-di(4-hydroxyphenyl) propane-phenol adduct thereby forming a mixture containing 2,2-di(4-hydroxyphenyl) propane as a solid phase and dilute aqueous phenol as a liquid phase. The solid phase consisting essentially of 2,2-di(4-hydroxyphenyl) propane is separated from the mixture by centrifuging at about 40° C. The resulting 2,2-di(4-hydroxyphenyl) propane is dried in air. A high purity 2,2-di(4-hydroxyphenyl) propane, free of discoloration, containing only traces of detectable impurities is thus obtained with a yield of about 90% by weight based on phenol.

Upon repeating the operation with recycling to the reactor of the mother liquor obtained in the separation of the phenol-2,2-di(4-hydroxyphenyl) propane adduct from the liquid phenolic phase the yield of 2,2-di(4-hydroxyphenyl) propane is increased to about 97% based on phenol charged. The increase is due to conversion of the recycled isomeric bis(hydroxyphenyl) propane by-products to the 2,2-di(4-hydroxyphenyl) propane.

*Example II*

Phenol and acetone in a mole ratio of phenol to acetone of 10:1 are charged to the top of a thermally insulated tower-type reactor. Methylmercaptan is added to the charge. Hydrogen chloride is introduced into the lower part of the column and passed upward through the tower-reactor countercurrently to the flow of liquid reactants. A pressure of 2 p. s. i. g. is maintained in the reactor. A high liquid level is maintained in the reactor. A residence time of 10 to 15 minutes is employed. The temperature of the charge entering the tower-reactor is adjusted to maintain a maximum temperature of about 80° C. at the inlet of the reactor. Gases comprising hydrogen chloride and methyl mercaptan are vented from the top of the reactor and recycled to the lower part of the reactor. Liquid is drawn from the lower part of the reactor and quenched with water. Sufficient sodium carbonate is added to the reaction mixture to neutralize it. The resulting neutralized aqueous reaction mixture is allowed to stratify at about 70° C., thereby forming a phenolic phase containing about 80% phenolic material including 2,2-di(4-hydroxyphenyl) propane and an aqueous phase containing about 10% of phenolic material consisting predominantly of phenol. The phenolic phase is separately cooled to a temperature of about 20° C. to 25° C. resulting in the separation of a solid phase consisting essentially of an adduct of 2,2-di(4-hydroxyphenyl) propane and phenol containing equimolecular parts of phenol and 2,2-di(4-hydroxyphenyl) propane. The adduct is separated from the phenolic phase by centrifuging. Water is added to the separated 2,2-di(4-hydroxyphenyl) propane-phenol adduct in an amount equal to about ten times the volume of the adduct. The resulting aqueous adduct mixture is brought to a temperature of 70° C. whereupon phenol is liberated from the adduct with the result that all of the phenol and very little of the 2,2-di(4-hydroxyphenyl) propane is dissolved in the water. The solid 2,2-di(4-hydroxyphenyl) propane is separated from the aqueous phenol by centrifuging. 2,2-di(4-hydroxyphenyl) propane is obtained with a yield of about 90% based on acetone charged. The 2,2-di(4-hydroxyphenyl) propane is found to be in the form of an extremely fine, colorless powder, finer than 400 mesh. Solutions obtained by dissolving the 2,2-di(4-hydroxyphenyl) propane product in hot water (80% bis(hydroxyphenyl) propane to 20% water) results in an almost colorless solution having an appreciably higher color stability than the solution of a similar product obtained as a bottoms product in conventional operational procedures.

The invention claimed is:

1. The method of separating a gem.di(hydroxyphenyl)alkane from a reaction mixture obtained by the acid-catalyzed condensation of a phenol with a carbonyl compound selected from the group consisting of aliphatic aldehydes and ketones and which reaction mixture contains said gem.di(hydroxyphenyl)alkane in admixture with a substantial amount of said unconverted phenol, which comprises crystallizing a solid phase from said mixture at a temperature of from about 0° to about 50° C. in the presence of an amount of said phenol exceeding the molecular equivalent of gem.di(hydroxyphenyl)-alkane in said mixture, separating said solid phase from said mixture, adding water to said separated solid phase in amount exceeding the volume of said separated solid phase thereby forming a mixture containing a solid phase consisting essentially of gem.di(hydroxyphenyl)alkane in a liquid phase consisting essentially of a dilute aqueous phenolic solution, and separating said solid phase consisting essentially of gem.di(hydroxyphenyl)alkane from said liquid phase.

2. The method of recovering 2,2-di(4-hydroxyphenyl) propane from a reaction mixture obtained by the acid-catalyzed condensation of phenol with dimethyl ketone and containing said 2,2-di(4-hydroxyphenyl) propane in admixture with unreacted phenol, which comprises bringing said reaction mixture to a temperature in the range of from about 0° C. to about 50° C. in the presence of an amount of phenol exceeding the molecular equivalent of the 2,2-di(4-hydroxyphenyl) propane content of said mixture, thereby forming a solid phase consisting essentially of 2,2-di(4-hydroxyphenyl) propane-phenol adduct in said mixture, separating said adduct-containing solid phase from said mixture, adding water to said separated adduct-containing solid phase in an amount exceeding the volume of said separated solid phase thereby forming a mixture comprising a solid phase consisting essentially of 2,2-di(4-hydroxyphenyl) propane in admixture with a liquid phase consisting essentially of dilute aqueous phenol, and separating said solid phase consisting essentially of 2,2-di(4-hydroxyphenyl) propane from said liquid phase consisting essentially of dilute aqueous phenol.

3. In the production of 2,2-di(4-hydroxyphenyl) propane wherein dimethyl ketone is reacted with phenol in the presence of an acid-acting catalyst in a reaction zone, and reactor effluence comprising 2,2-di(4-hydroxyphenyl) propane in admixture with unreacted phenol and isomeric phenolic by-products is withdrawn from said reaction zone, the steps which comprise adding water to said reactor effluence, stratifying the resulting aqueous reaction mixture at 35° C. to 100° C., thereby separating a liquid phenolic phase containing 2,2-di(4-hydroxyphenyl) propane, phenol and isomeric phenolic by-products from a liquid aqueous phase containing water and phenol, crystallizing a solid phase at a temperature of from about 0° to about 50° C. from said phenolic phase in the presence of an amount of phenol exceeding the molecular equivalent of 2,2-di(4-hydroxyphenyl)propane, separating said solid phase from said phenolic phase thereby forming a mother liquor containing unreacted phenol and isomeric phenolic by-products, adding water to said solid phase separated from said phenolic phase in an amount equal to at least four times the weight of said solid phase thereby forming a mixture containing a solid phase consisting essentially of 2,2-di(4-hydroxyphenyl) propane and a liquid phase consisting essentially of aqueous phenol, separating said solid phase consisting essentially of 2,2-di(4-hydroxyphenyl) propane from said liquid phase consisting essentially of aqueous phenol and recycling said mother liquor containing phenol and isomeric phenolic by-products to said reaction zone.

4. The method of separating 2,2-di(4-hydroxyphenyl) propane from a reaction mixture obtained by the acid-catalyzed condensation of phenol with dimethyl ketone in the presence of a molecular excess of phenol which reaction mixture contains 2,2-di(4-hydroxyphenyl) propane in admixture with unreacted phenol, which comprises adding water to said mixture, stratifying the resulting aqueous reaction mixture at 35° C. to 100° C., thereby separating a liquid phenolic phase containing 2,2-di(4-hydroxyphenyl) propane and phenol from a liquid aqueous phase containing water and phenol, bringing said phenolic phase to a temperature in the range of from about 0° C. to about 50° C. and in the presence of an amount of phenol exceeding the molecular equivalent of 2,2-di(4-hydroxyphenyl)-propane, thereby forming a mixture containing a solid phase consisting essentially of a 2,2-di(4-hydroxyphenyl) propane-phenol adduct in a liquid phase consisting essentially of phenol, separating said adduct-containing solid phase from said liquid phenol phase, adding water to said separated adduct-containing solid phase in an amount equal to at least four times the weight of said adduct, thereby forming a mixture containing a solid phase consisting essentially of 2,2-di(4-hydroxyphenyl) propane and a liquid phase consisting essentially of aqueous phenol and separating said solid phase consisting essentially of 2,2-di(4-hydroxyphenyl) propane from said liquid phase consisting essentially of aqueous phenol.

5. The method of separating 2,2-di(hydroxyphenyl) propane from a reaction mixture obtained by the hydrogen chloride catalyzed condensation of phenol with dimethyl ketone, which reaction mixture contains 2,2-di(4-hydroxyphenyl) propane in admixture with unreacted phenol, which comprises adding water and an alkaline material to said reaction mixture, stratifying the resulting aqueous reaction mixture at 35° C. to 100° C., thereby separating a liquid phenolic phase containing 2,2-di(4-hydroxyphenyl) propane and phenol from a liquid aqueous phase containing water and phenol, bringing said phenolic phase to a temperature in the range of from about 0° C. to about 50° C. and in the presence of an amount of phenol exceeding the molecular equivalent of 2,2-di(4-hydroxyphenyl)-propane, thereby crystallizing out a phenol-bis(hydroxyphenyl) propane adduct-containing solid phase, separating said adduct-containing solid phase from said phenolic phase, adding water to said separated adduct-containing solid phase in an amount equal to at least four times the weight of said adduct thereby forming a mixture containing a solid phase consisting essentially of 2,2-di(4-hydroxyphenyl) propane and a liquid phase in an amount equal to at least four times the weight of said adduct consisting essentially of aqueous phenol, and separating said solid phase consisting essentially of 2,2-di(4-hydroxyphenyl) propane from said liquid phase consisting essentially of aqueous phenol at a temperature in the range of from about 0° C. to about 80° C.

6. The method of recovering 2,2-di(4-hydroxyphenyl)-propane from a crude 2,2-di(4-hydroxyphenyl)-containing mixture containing said 2,2-di(4-hydroxyphenyl)propane in admixture with phenol and isomeric phenolic impurities which comprises bringing said mixture to a temperature in the range of from about 0° C. to about 50° C. in the presence of an amount of phenol exceeding the molecular equivalent of the 2,2-di(4-hydroxyphenyl)-propane content of said mixture, thereby forming a solid phase consisting essentially of 2,2-di(4-hydroxyphenyl)-propane-phenol adduct in said mixture, separating said adduct-containing solid phase from said mixture, adding water in an amount exceeding the volume of said adduct to said separated adduct-containing solid phase thereby forming a mixture comprising a solid phase consisting essentially of 2,2-di(4-hydroxyphenyl)propane in admixture with a liquid phase consisting essentially of dilute aqueous phenol, and separting said solid phase consisting essentially of 2,2-di(4-hydroxyphenyl)propane from said liquid phase consisting essentially of dilute aqueous phenol.

7. The method of recovering 2,2,-di(4-hydroxyphenyl)-propane from a crude 2,2-di(4-hydroxyphenyl) containing said 2,2-di(4-hydroxyphenyl)propane in admixture with phenol and isomeric phenolic impurities which comprises adding water to said mixture, stratifying the resulting aqueous mixture at 35° C. to 100° C., thereby separating a liquid phenolic phase containing 2,2-di(4-hydroxyphenyl)propane, phenol and isomeric phenolic by-products from a liquid aqueous phase containing water and phenol, crystallizing a solid phase from said phenolic phase at a temperature of from about 0° to about 50° C. in the presence of an amount of phenol exceeding the molecular equivalent of 2,2-di(4-hydroxyphenyl)propane, separating said solid phase from said phenolic phase thereby forming a mother liquor containing unreacted phenol and isomeric phenolic by-products, adding water in an amount equal to at least four times the weight of said adduct to said solid phase separated from said phenolic phase thereby forming a mixture containing a solid phase consisting essentially of 2,2-di(4-hydroxyphenyl)propane and a liquid phase consisting essentially of aqueous phenol, and separating said solid phase consisting essentially of 2,2,-di(4-hydroxyphenyl)propane from said liquid phase consisting essentially of aqueous phenol.

8. In the process for the production of a gem.di(hydroxyphenyl) alkane wherein a phenol is reacted with a carbonyl compound selected from the group consisting of aliphatic aldehydes and ketones in a reaction zone in the presence of a stoichiometric excess of said phenol and an acid acting catalyst, and reactor effluence comprising gem.-di(hydroxyphenyl) alkane in admixture with the unconverted portion of said phenol and phenolic impurities are withdrawn from said reaction zone, the steps which comprise adding an aqueous phenolic stream obtained within the system to said reactor effluence, stratifying the resulting mixture in a stratification zone at a temperature of from about 35 to about 100° C., thereby separating an aqueous phase from a phenolic phase containing said gem.di(hydroxyphenyl) alkane in said stratification zone, bringing said phenolic phase to a temperature of from about 0° C. to about 50° C., thereby crystallizing out a solid phase consisting of an adduct of said gem.di(hydroxyphenyl) alkane with said phenol, separating said solid phase from said phenolic phase thereby forming a phenolic mother liquor containing said isomeric phenolic impurities, recycling at least a part of said mother liquor to said reaction zone, adding water to said adduct—containing solid phase in an amount equal to about four times the weight of said solid phase, thereby forming a mixture containing solid gem.di(hydroxyphenyl) alkane in a liquid aqueous phenolic phase, separating said solid gem.di(hydroxyphenyl) alkane from said liquid aqueous phenolic phase, and adding at least a part of said aqueous phenolic phase to said reactor effluence as said aqueous phenolic stream obtained within the system.

References Cited in the file of this patent

UNITED STATES PATENTS

| | | |
|---|---|---|
| 2,035,889 | Ipatieff | Mar. 31, 1936 |
| 2,182,308 | Britton et al. | Dec. 5, 1939 |
| 2,232,674 | Pyzel | Feb. 18, 1941 |
| 2,359,242 | Perkins et al. | Sept. 26, 1944 |
| 2,468,982 | Jansen | May 3, 1949 |
| 2,623,908 | Stoesser et al. | Dec. 30, 1952 |